E. O. SCHWEITZER.
OVERLOAD CIRCUIT OPENER.
APPLICATION FILED APR. 21, 1913.
1,214,718.  Patented Feb. 6, 1917.
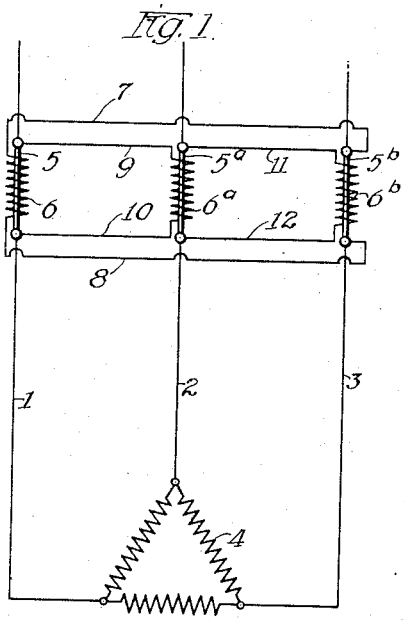
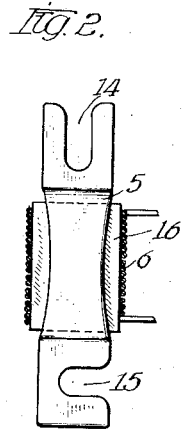
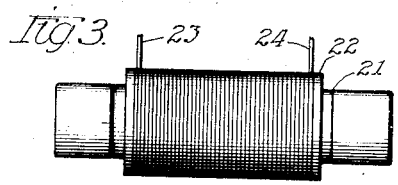
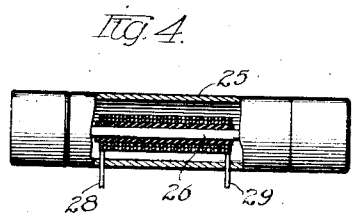
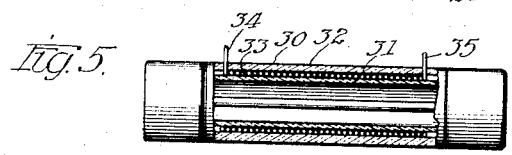
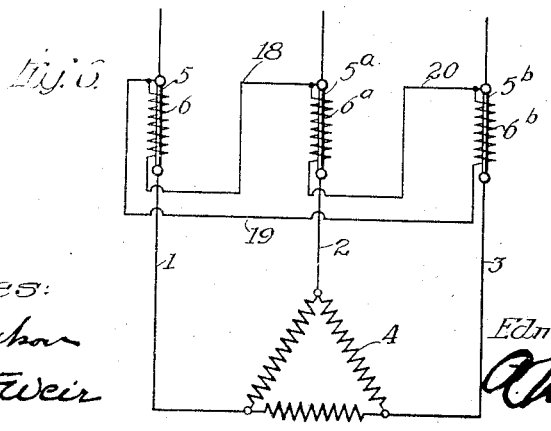
Witnesses:
Arthur W. Cashow
Robert F. Weir
Inventor
Edmund O. Schweitzer

UNITED STATES PATENT OFFICE.

EDMUND O. SCHWEITZER, OF CHICAGO, ILLINOIS.

OVERLOAD CIRCUIT-OPENER.

1,214,718.  Specification of Letters Patent.  Patented Feb. 6, 1917.

Application filed April 21, 1913. Serial No. 762,463.

*To all whom it may concern:*

Be it known that I, EDMUND O. SCHWEITZER, a citizen of the United States, residing at Chicago, in the county of Cook and State of Illinois, have invented a certain new and useful Improvement in Overload Circuit-Openers, of which the following is a full, clear, concise, and exact description, reference being had to the accompanying drawings, forming a part of this specification.

My invention relates to overload circuit openers.

Prominent objects of the invention are to provide a simple, practical, and efficient type of overload circuit opening arrangement; to permit the opening of a circuit upon an overload in another circuit or apparatus; to permit the opening of a circuit upon an overload either in that circuit or in another circuit or apparatus; to provide an efficient and effective arrangement for controlling overload currents in a multiphase system; and to secure the foregoing and other desirable results in a simple and expeditious manner.

In the accompanying drawings I show my invention applied to a 3-phase system, but it will be understood that the invention can be applied to other apparatus and in other ways.

In the accompanying drawings, Figure 1 is a view illustrating a multiphase system and a motor therein, and an overload circuit opening arrangement embodying my present invention; Fig. 2 is a view of a detail of construction; Figs. 3, 4 and 5 are views of modified forms of detail construction; and Fig. 6 is a view similar to Fig. 1 of a modified arrangement of the invention.

In the accompanying drawings, and especially in Figs. 1 and 2, a 3-phase system with conductors 1, 2 and 3 is shown, said conductors leading to a motor 4. In each of the conductors 1, 2 and 3 are located fuses 5, 5$^a$, and 5$^b$, which may be the ordinary type of fuse adapted to operate or blow in the usual way upon an overload in the circuit conductors in which said fuses are respectively located. I also show heating coils 6, 6$^a$ and 6$^b$ of resistance wire wound about the several fuses 5, 5$^a$ and 5$^b$. These heating coils 6, 6$^a$ and 6$^b$ are of sufficiently fine and high resistance wire to generate sufficient heat to melt or operate the fuses 5, 5$^a$, and 5$^b$ upon a predetermined overload current flowing in said coils, 6, 6$^a$ and 6$^b$. The coils 6, 6$^a$, and 6$^b$ are preferably connected so as to receive current from the circuits or conductors other than the circuits or conductors containing the fuses which said coils respectively include. As one arrangement I show in Fig. 1 the coil 6 for the fuse 5 in conductor 1 connected by conductors 7 and 8 in shunt with conductor 3; the coil 6$^a$ for fuse 5$^a$ included by conductors 9 and 10 in shunt with conductor 1 and also coil 6$^b$ for fuse 5$^b$ connected by conductors 11 and 12 in shunt with conductor 2. Thus the fuse 5, for example, may be operated by an overload current in conductor 2 because of the coil 6 receiving current from the circuit including conductor 2. Similarly fuse 5$^a$ may be operated by an overload current in conductor 2, and also an overload current in conductor 1, and also fuse 5$^b$ may be operated by an overload current in conductor 3, and also by an overload current in conductor 2. Thus it will be seen that if for example an overload current in conductor 1 should operate or blow fuse 5, but the other conductors 2 and 3 of the system were not receiving sufficient overload current to blow the fuses 5$^a$ and 5$^b$, respectively, as for example where said fuses take more current than they should, as sometimes happens, the overload current in conductor 1 would to some extent persist notwithstanding the blowing of the fuse 5, and would pass by conductors 9 and 10 through coil 6$^a$ and thereby produce a heating effect upon fuse 5$^a$ in conductor 2, which heating effect together with the load in fuse 5$^a$ would operate the latter, and thereby cut out the motor. Thus the entire system would be fully protected by the operation of the fuses in connection with the coils 6, 6$^a$ and 6$^b$, it being understood that the latter are sufficiently fine to burn out when the fuses with which they are associated have operated. Thus it will be seen that full protection may be accorded to apparatus on 3-phase or polyphase systems, and so serious damage and injury may be prevented upon such systems where previously it has occurred by reason of the operation of the fuse in one line and the failure of the fuses in the other lines to operate.

In Fig. 2 I show one way in which the fuses 5, 5$^a$ and 5$^b$ may be associated with the coils 6, 6$^a$, and 6$^b$. Fig. 2 shows a fuse of more or less usual type having apertures or slots 14 and 15 for connection with binding posts or terminals and a coil of wire 6 around about said fuse and especially the middle portion thereof, layers 16 of mica or other material being placed on opposite sides of the fuse to accommodate the wire windings. In Fig. 6 I show a 3-phase system similar to that shown in Fig. 1, but in this arrangement the coils 6, 6ª and 6ᵇ are connected somewhat differently. For example these coils 6, 6ª and 6ᵇ are connected by conductors 18, 19 and 20 in a series parallel arrangement with themselves and the line conductors 1, 2 and 3, as shown.

In Figs. 3, 4 and 5 are shown arrangements by which the invention may be applied to inclosed fuses. In Fig. 3, for example, is a cylindric inclosed fuse 21 having a cylindric sleeve or housing 22 applied to it, a heating coil for melting the inclosed fuse being arranged in or carried by the sleeve 22, the ends of said coil being connected by conductors 23 and 24.

In Fig. 4 I show an inclosed fuse 25, in which the interior fuse proper 26 is surrounded by a heating coil 27, from which connecting conductors 28 and 29 are extended.

In Fig. 5 I show an inclosed fuse 30 containing a glass tube 31 in which a fuse 32 is extended, the glass tube 31 being surrounded by a heating coil 33, to which connection may be made by conductors 34 and 35.

It will be understood that my invention may be applied and used in ways other than those shown herein, and that changes and modifications can be made in the structures herein without departing from the spirit of the invention.

What I claim is:

1. The combination of several circuits, a fuse included in one circuit, and a heating coil for operating said fuse included in shunt in another circuit.

2. The combination of a plurality of circuits, of fuses in said circuits, and heating coils for operating said fuses, the heating coil for each fuse being included in shunt in another circuit.

3. The combination with a polyphase system having its line conductors provided with fuses, of heating coils in heating proximity to said fuses and circuit connections connecting said heating coils in shunt with line conductors other than those in which the fuses are respectively included.

In witness whereof, I hereunto subscribe my name this 18th day of April, A. D., 1913.

EDMUND O. SCHWEITZER.

Witnesses:
  A. L. JONES,
  HAZEL ANN JONES.